United States Patent [19]

Palazzetti et al.

[11] 4,370,562

[45] Jan. 25, 1983

[54] ELECTRIC POWER DISTRIBUTION SYSTEM

[75] Inventors: Mario Palazzetti; Gianfranco Salotti, both of Avigliana, Italy

[73] Assignee: Centro Ricerche Fiat S.p.A., Turin, Italy

[21] Appl. No.: 237,823

[22] Filed: Feb. 25, 1981

[30] Foreign Application Priority Data

Mar. 11, 1980 [IT] Italy .................... 67378 A/80

[51] Int. Cl.³ ............................... H02J 3/14
[52] U.S. Cl. ............................................ 307/38
[58] Field of Search ............... 307/11, 38, 39, 31, 307/34

[56] References Cited

U.S. PATENT DOCUMENTS

| 3,189,747 | 6/1965 | Hoff | 307/38 X |
| 4,181,950 | 1/1980 | Carter | 307/39 X |
| 4,245,319 | 1/1981 | Hedges | 307/31 X |

Primary Examiner—Donald A. Griffin
Attorney, Agent, or Firm—Sughrue, Mion, Zinn, Macpeak & Seas

[57] ABSTRACT

A power distribution system is provided which includes:
  a plurality of power outlets connected to the supply conductors of the system and enabling the connection of a corresponding plurality of electrical loads to the system; and
  a control unit connected by control conductors to the power outlets and arranged to monitor both the power suppliable by the system and the power required by the electrical loads for their operation.

Each power outlet includes a switching arrangement with two operating states. In its first state, the switching arrangement enables a load connected to the power outlet to be measured by the control unit, this switching arrangement being thereafter switched into its second state by the said control unit to enable the load to be supplied with the power required for its operation only if this power does not exceed the yet-unused electric power capacity of the system.

In one embodiment, each power outlet is arranged to disconnect its associated load on command by the control unit when the system is at the point of becoming overloaded.

5 Claims, 5 Drawing Figures

ELECTRIC POWER DISTRIBUTION SYSTEM

BACKGROUND OF THE INVENTION

The present invention relates to electric power distribution systems.

In systems currently in use for distributing electrical power, there exist various problems of great importance such as the need to adapt the load curve of the distribution system to the availability of power itself in the best manner possible, whether the generation of this power takes place in the present centralised manner or is supplemented in the future with local generating systems.

It is also necessary to minimise the risk which can occur of a so-called "black-out" of the system or of sections thereof due to overloading by an individual user which at present brings about the automatic cutout of all the related electrical loads.

The object of the present invention is to provide an electric power distribution system which allows the connection of one or more electrical loads only when the electric power capacity of the system is sufficient to supply these loads.

SUMMARY OF THE INVENTION

According to the present invention, there is provided an electric power distribution system comprising:
two power supply conductors;
a plurality of power outlet units connected to said two supply conductors whereby to enable the connection to the system of a corresponding plurality of electrical loads;
control conductor means;
a control unit connected by said control conductor means to each said power outlet unit and adapted:

(a) to carry out, at the moment of connection of a said load to a said power outlet unit, a measurement indicative of the increase in power which would need to be supplied by the system to power this load, this measurement being effected in such a manner as to avoid appreciable overloading of the system;

(b) to effect a comparison of the result of said measurement with a measure of the additional power suppliable by the system, and (c) to provide a comparison-indicative signal indicative of the result of said comparison;

each said power outlet unit including a switching arrangement having two operational states, in the first of which the connection of a said load to said power outlet unit results in the load being inserted between said control conductor means and one of the said supply conductors whereby to enable the control unit to carry out said measurement for that load and effect said comparison, and in the second of which the said switching arrangement connects the load across the two said supply conductors; change over from said first to said second state occurring only when the comparison-indicative signal provided by the control unit indicates that the power required for the operation of this load will not result in the maximum power suppliable by the system being exceeded.

DESCRIPTION OF THE PREFERRED EMBODIMENTS

Figure 1:
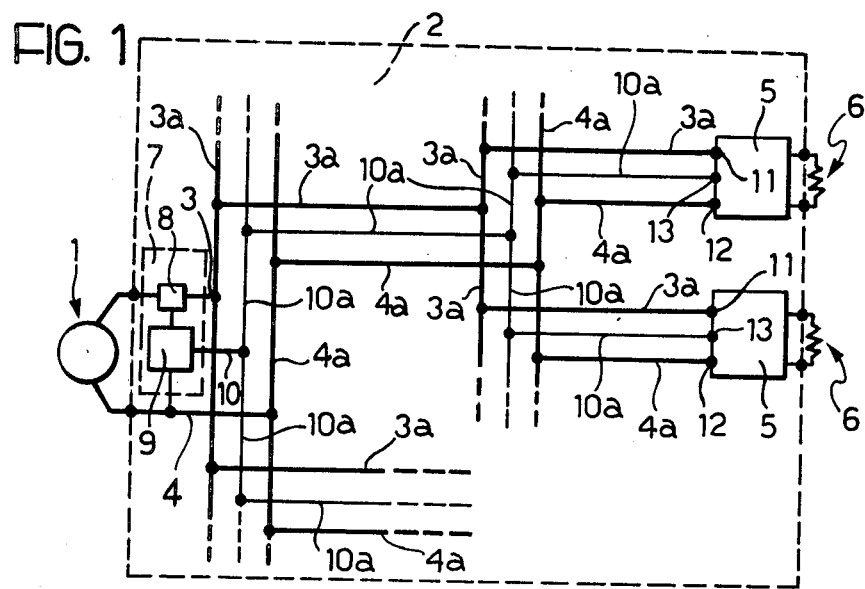
FIG. 1 is a circuit diagram of an electric power distribution system according to the present invention.

In FIG. 1, by 1 is indicated an electric power generator connected to a distribution system according to the invention.

The system 2 includes two power-supply conductors 3, 4 connected to the generator 1. A plurality of pairs of conductors are connected in parallel with the conductors 3 and 4 and constitute in their entirety a branched electrical power distribution line.

All the conductors of this branched line which constitute successive branches of the power supply conductor 3 have been given the same reference numeral 3a.

All the conductors which constitute successive branches of the power supply conductor 4 have been given the same reference numeral 4a.

The ends of each pair of final supply conductors 3a, 4a are connected to a respective power outlet 5 for enabling the connection of a load 6 to the system 2.

A control unit indicated in its entirety by 7, includes a measuring instrument 8 for measuring the electrical power fed to the system 2 by the generator 1, and a command and processing unit 9 connected to the said measuring instrument 8.

The command and processing unit 9 is connected to a control conductor 10 which is connected through successive branches to each power outlet 5.

All the conductors constituting successive branches of the control conductor 10 have been given the same reference numeral 10a. Furthermore, in the following description, both the conductor 10 and its branches 10a will be referred to by the term "control conductor". As will be more fully described below, the control unit 7 is arranged to measure, at the moment of connection of an electrical load 6 to a power outlet 5, the increase in power which must be supplied by the system 2 to feed this load 6, this measurement being effected without causing appreciable overloading of the system 2. This control unit 7 is, moreover, arranged to compare this measurement with the additional power suppliable by the system and to provide signals indicative of this comparison.

Figure 2:
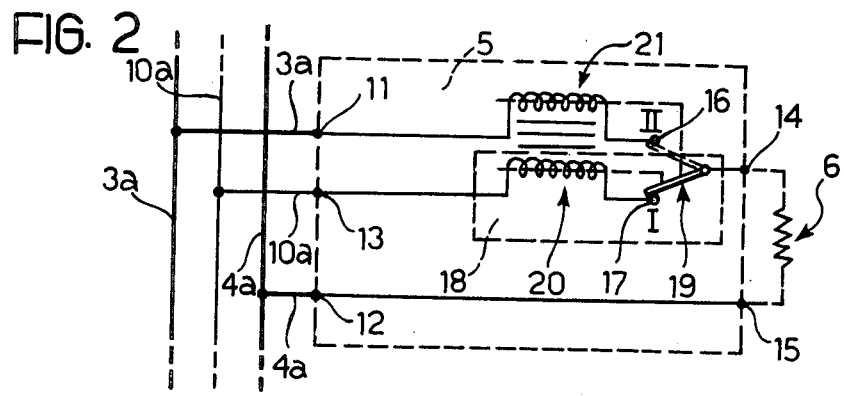
FIG. 2 is a circuit diagram of a first embodiment of a power outlet for the system of FIG. 1.

In a first embodiment, illustrated in FIG. 2, each power outlet 5 has a first and a second input terminal, indicated respectively by 11 and 12, connected to a pair of final power-supply conductors 3a, 4a. In addition, each power outlet 5 has a third input terminal 13 which is connected to the control unit 7 by means of the control conductors 10a and 10.

Each power outlet 5 has a first and a second output terminal, respectively indicated 14 and 15, to which, in use, an electrical load 6 is connected.

Each power outlet 5 further includes a first and a second fixed electrical contact respectively indicated by 16 and 17.

A relay 18 includes a movable contact member 19 connected to the first output terminal 14 of the power outlet 5. This contact member 19 is movable between first and second positions indicated respectively by I and II, in which it connects the output terminal 14 of the power outlet 5 to the fixed contacts 17 and 16 respectively.

The relay 18 further includes an excitation coil 20 inserted between the input terminal 13 and the fixed contact 17 of the power outlet 5.

Each power outlet 5 further includes a hold-on coil 21 inserted between the input terminal 11 and the fixed contact 16 of the power outlet. As will be described below, the hold-on coil 21 is arranged to maintain the movable contact member 19 of the relay 18 in its working position indicated by II throughout the entire time during which an electrical load 6 is supplied from the distribution system 2.

The operation of the electrical power distribution system illustrated in FIG. 1, and of the FIG. 2 embodiment of the power outlet 5 of the invention, is as follows.

When no load 6 is connected to a power outlet 5, the movable member 19 of this outlet is in the position indicated by I in FIG. 2.

Connection of an electrical load 6 to the output terminals 14, 15 of a power outlet 5, results in the load being connected in parallel, via the excitation coil 20, with the line constituted by the control conductor 10a and the power supply conductor 4a, these conductors being connected, respectively, to the input terminals 13 and 12 of this power outlet 5. Under these conditions the control unit 7 effects a measurement of the load 6 connected to the system 2 to evaluate the electrical power which this load requires for its operation. This power may be deduced by means of a simple impedance measurement and, for this purpose, the processing and command unit 9 can include a known bridge measuring circuit. Conveniently, the impedance of the load 6 connected to a power outlet 5 can be measured with very small currents whereby this measurement does not result in appreciable overloading of the system 2.

Once the power required by the load for its operation has been evaluated, the control unit 7 "decides", on the basis of the power being supplied to the system by the generator 1 at that moment, and on the basis of the additional power which this generator is capable of supplying to the system, whether the load 6 may be connected in parallel with the power supply conductors 3a, 4a which terminate at the power outlet 5.

Whenever the additional electrical power available from the generator 1 is sufficient to supply the load, the processing and command unit 9 sends a current pulse through the control conductors 10, 10a to excite the coil 20 of the relay 18 of the power outlet 5 to which the electrical load is connected, this pulse being of a sufficient magnitude to bring about the movement of the movable member 19 from position I to position II. As a result, the electrical load 6 is connected in parallel, via the hold-on coil 21, with the line constituted by the power supply conductors 3a, 4a which terminate at the input terminals 11, 12 of the power outlet 5 to which this load 6 has been connected.

The current fed to the load 6 passes through the hold-on coil 21 and hence maintains the movable member 19 in position II as long as the load 6 is not disconnected from the power outlet 5.

When the electrical load 6 is disconnected from the power outlet 5, the hold-on coil 21 is de-energised and hence the movable member 19 returns to position I under the action, for example, of a return spring, not shown.

If, however, the additional electrical power available from the generator 1 is less than the electrical power required for the operation of the load 6 connected to a power outlet 5, the processing and command unit 9 does not emit a pulse for exciting the relay 18, so that the movable member 19 remains in position I and the load 6 in question is not energised.

Conveniently the excitation coil 20 and the hold-on coil 21 of each power outlet 5 are wound on a single, saturable core to reduce the power dissipation in the outlet 5 to a very low value when the electrical load 6 is connected. The core can be saturated by means of sufficiently small load currents for the power outlet 5 to be able to supply even low powers to the electrical load 6.

Figure 3:
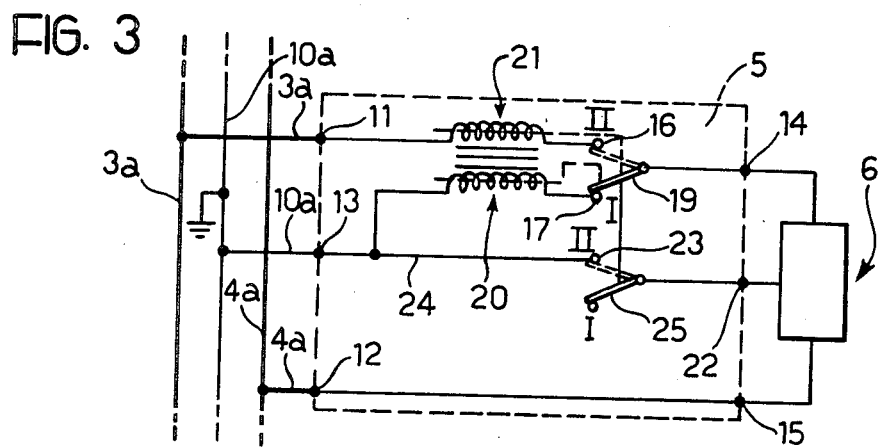
FIG. 3 is a circuit diagram illustrating a second embodiment of the power outlet illustrated in FIG. 2.

In a different embodiment, the control conductors 10, 10a illustrated in FIGS. 1 and 2 are connected to earth and each power outlet 5 is formed as illustrated in FIG. 3. In this embodiment, each power outlet 5 further includes a third output terminal 22 to which the earth terminal of an electrical load 6 is connected in use. Each power outlet 5 further includes a third contact 23 which is fixed in the power outlet and is connected to the third input terminal 13 by means of a conductor 24. The relay of each power outlet 5 further includes a second movable contact member 25 rigidly fixed to the first movable contact member 19 and connected to the third output terminal 22 of the power outlet. The second contact member 25 is movable between a position indicated by II in which it connects the output terminal 22 of the power outlet 5 to the corresponding input terminal 13, and a position indicated by I, in which it breaks this connection.

The operation of the embodiment of the distribution system in which the control conductors 10, 10a are connected to earth, and in which each power outlet 5 is of the form illustrated in FIG. 3, is not substantially different from that described above with reference to FIGS. 1 and 2. Hence, when a power outlet 5 is not connected to a load 6, the movable contact members 19, 25 are in position I.

When an electrical load 6 is connected to the output terminals 14, 15, 22 of a power outlet 5, this load becomes connected in parallel, via the excitation coil 20, with the line constituted by the control conductor 10a and the power supply conductor 4a, these conductors being connected to the input terminals 13, 12 of this power outlet 5. In this phase, the control unit 7 carries out the comparison of the additional electrical power available with the electrical power required by the load 6 for its operation.

If the additional electrical power available from the generator 1 is sufficient to supply the load 6 in question, the processing and command unit 9 sends a pulse through the control conductors 10, 10a which is of sufficient magnitude to result in the excitation of the coil 20 and the consequent movement of the movable contact members 19, 25 from position I to position II. As a consequence, the load 6 is energised.

In the embodiment described immediately above, the conductors 10, 10a have the dual functions of earth conductors of the system and control conductors.

Figure 4:
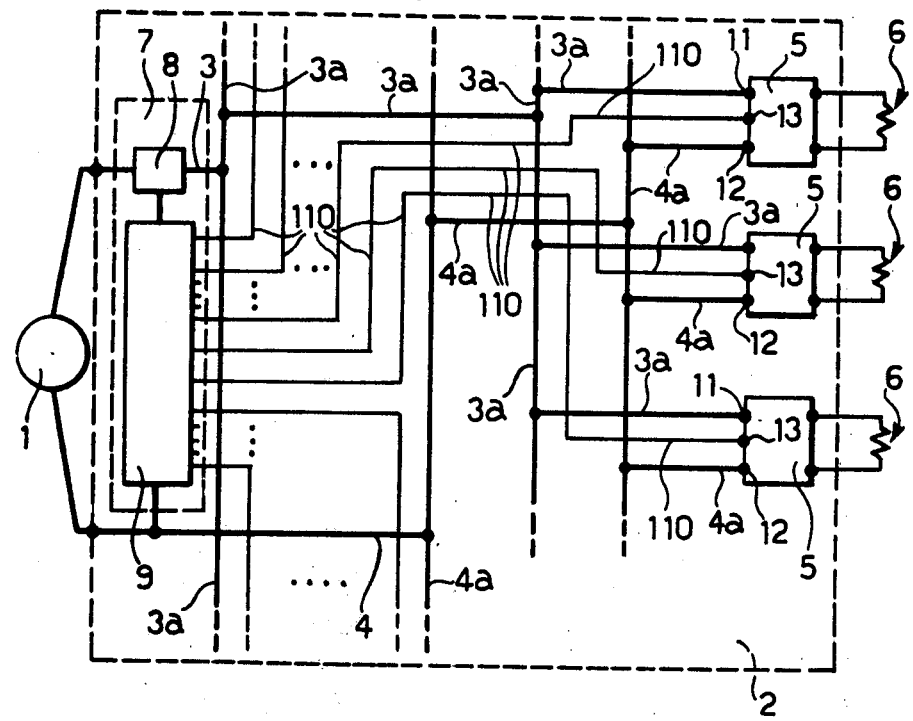
FIG. 4 is a circuit diagram illustrating a second embodiment of the electric power distribution system of the present invention.

In a further embodiment, illustrated in FIG. 4, the electrical power distribution system includes a plurality of control conductors 110 each of which connects a corresponding terminal of the processing and command unit 9 within the control unit 7 to the input terminal 13 of a respective power outlet 5.

Figure 5:
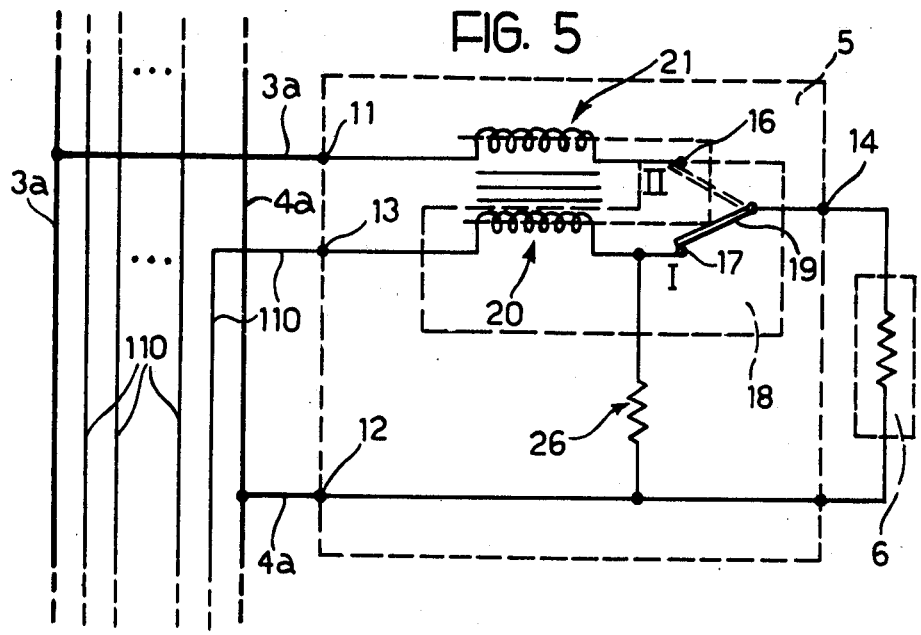
FIG. 5 is a circuit diagram illustrating a power outlet for the system of FIG. 4.

In this embodiment of the system, each power outlet 5 may be formed as illustrated in FIG. 5. This embodiment differs from that illustrated in FIG. 2 only in that a resistor 26 is inserted between the fixed contact 17 and the input terminal 12 of the power outlet. This resistor 26 has a known resistance, for reasons which will be described below, which is very high so that very little electrical power is dissipated in it when current passes through it in operation.

The operation of the system 2 illustrated in FIG. 4 and including a plurality of power outlets 5 of the type illustrated in FIG. 5, is as follows.

When no load 6 is connected to a power outlet 5, the movable contact member 19 of the relay 18 of this outlet is in position I.

When a load 6 is connected to the output terminals 14, 15 of a power outlet 5, this load 6 becomes connected in parallel with the resistor 26 of this outlet. Under these conditions, both the load 6 and the said resistor 26 are connected in parallel with a line constituted by the control conductor 110 and the power supply conductor 4a, these conductors being connected to the input terminals 13, 12, respectively, of the power outlet 5. This line is connected to the processing and command unit 9 which, in the manner previously described, carries out a measurement of the impedance presented by the load 6 and the resistor 26 connected in parallel with each other. Since, as noted above, the value of the resistance of the resistor 26 is known, the processing and command unit 9 is able to deduce from the said measurement the value of the impedance of the load 6, and hence is able to evaluate the electrical power which this latter needs for its operation.

Whenever the electrical power necessary for the operation of the load 6 is compatible with the additional electrical power available, the control unit 7 brings about, in the manner described above, the commutation of the movable contact member 19 of the power outlet 5 to which the load is connected, from position I to position II. Consequently power is fed to the load 6 through the supply conductors 3a, 4a connected to the input terminals 11, 12 of the power outlet 5 to which this load 6 is connected.

The embodiment of the system 2 which is illustrated in FIG. 4 and which includes a plurality of power outlets of the type illustrated in FIG. 5, also enables the supply of power to one or more electrical loads 6 connected to respective power outlets 5 to be interrupted whenever, for various different reasons, (breakdowns, etc.), the electrical power temporarily available is less than the power required to feed all the loads which are connected to the supply conductors of the distribution system 2 at a particular instant. This occurs in the following manner.

With reference to FIG. 5, suppose that the movable contact member 19 of the relay 18 of a power outlet 5 is in position II whereby the load 6 connected to this power outlet 5 is electrically connected in parallel with the power supply conductors 3a, 4a connected to the input terminals 11, 12 of this power outlet 5. In this condition the electrical power required by this load 6 for its operation is fed thereto.

Supposing now that due, for example, to breakdown of the generator 1 or a loss of power thereby, the power available in the system 2 is not sufficient to allow all the loads 6 connected to this system to be supplied.

Under these conditions the control unit 7, by means of the measuring instrument 8, senses the reduction in power supplied to the system by the generator 1 and, on the basis of the remaining availability of power, brings about the de-energisation of a certain number of electrical loads 6, as will be described below, so as to avoid the overloading of the system 2 and all the consequent dangers.

In order to de-energise a load 6 supplied from the system by means of a respective power outlet 5, it suffices for the processing and command unit 9 to send, via the line constituted by the control conductor 110 and the power supply conductor 4a connected to this power outlet 5, and via the resistor 26 of this outlet, a current pulse of sufficient magnitude to result in the excitation of the coil 20 so as to effect the commutation of the movable contact member 19 from position II to position I. Clearly, this pulse has the opposite polarity from that of the pulse needed to switch the movable contact member 19 from position I to position II.

Since each power outlet 5 is connected to the control unit 7 by means of a respective line constituted by a control conductor 110 and a power supply conductor 4a, this control unit 7 is able to deactivate selectively a sufficient number of loads 6 so as to avoid overloading of the distribution system 2.

Conveniently, the power outlets 5 may be subdivided into two distinct groups, for supplying respectively, loads with "deferable" functions and loads with "non-deferable" functions. By loads with "deferable" functions are meant loads the operation of which may be temporarily interrupted without detriment to the service which they offer. For example a domestic washing machine constitutes a deferable-function load, in that a temporary interruption of its operation does not result in hardship or specific problems.

By loads with "non-deferable" functions are, however, meant loads the operation of which cannot be interrupted, even temporarily, without causing some hardship to the user. An example of such "non-deferable" loads is constituted by domestic lighting apparatus.

The control unit 7 is conveniently programmed with this sub-division of the power outlets 5 so that, when a loss of available power occurs, it causes the deactivation of a number of deferable-function loads sufficient to avoid the overloading of the distribution system 2.

Conveniently, the processing and command unit 9 of the control unit 7 may include a timer device arranged to cause the deactivation of "deferable" function loads during certain periods of the day in which the overall electrical load connected to the system may be excessive. In this manner it is possible to prevent the occurrence of dangerous black-outs of the whole system.

The distribution system 2 in the embodiment of the invention illustrated in FIGS. 4, 5 may constitute, for example, a local distribution system connected to the national distribution system, rather than to a generator 1. In this case, the processing and command unit 9 of the control unit 7 may be arranged, in known manner, to receive a command for de-activating the deferable loads, this command coming from a system for controlling the availability of power within a wider region of the national system. This command signal may be transmitted to the control unit, for example, by means of a carrier wave.

Alternatively, the electric power distribution system 2 according to the invention may constitute an independent local distribution system. In this case, the generator 1 may consist of a local electrical power generator unit.

Naturally, the principle of the invention remaining the same, the embodiments and the modes of realisation may be varied widely with respect to that described and illustrated purely by way of non-limiting example, without thereby departing from the scope of the present invention.

We claim:

1. An electric power distribution system comprising:
two power supply conductors;
a plurality of power outlet units connected to said two supply conductors whereby to enable the connection to the system of a corresponding plurality of electrical loads;
control conductor means;
a control unit connected by said control conductor means to each said power outlet unit and adapted:
(a) to carry out, at the moment of connection of a said load to a said power outlet unit, a measurement indicative of the increase in power which would need to be supplied by the system to power this load, this measurement being effected in such a manner as to avoid appreciable overloading of the system;
(b) to effect a comparison of the result of said measurement with a measure of the additional power suppliable by the system, and
(c) to provide a comparison-indicative signal indicative of the result of said comparison;
each said power outlet unit including a switching arrangement having two operational states, in the first of which the connection of a said load to said power outlet unit results in the load being inserted between said control conductor means and one of the said supply conductors whereby to enable the control unit to carry out said measurement for that load and effect said comparison, and in the second of which the said switching arrangement connects the load across the two said supply conductors; change over from said first to said second state occurring only when the comparison-indicative signal provided by the control unit indicates that the power required for the operation of this load will not result in the maximum power suppliable by the system being exceeded,
said control conductor means include a primary control conductor emanating from said control unit and a plurality of further control conductors branching from said primary control conductor and each connected to a respective said power outlet unit, and each said power outlet unit comprising:
first and second input terminals connected respectively to said first and second power supply conductors of the distribution system;
a third input terminal connected to the corresponding said further control conductor;
first and second output terminals to which, in use, an electrical load can be connected;
first and second fixed electrical contacts;
a relay including an excitation winding and a movable contact member, said movable contact member being connected to the said first output terminal and being movable between a working position and a rest position in which it is in contact, respectively, with said first and second contacts, and the said excitation coil of the relay being connected between the third input terminal and the said second contact, and
a hold-on coil connected between said first input terminal and said first fixed contact and operative to maintain the said movable contact member in its working position for the entire period of time during which a said load connected to the power outlet unit is supplied by the said electric power distribution system.

2. An electric power distribution system comprising:
two power supply conductors;
a plurality of power outlet units connected to said two supply conductors whereby to enable the connection to the system of a corresponding plurality of electrical loads;
control conductor means;
a control unit connected by said control conductor means to each said power outlet unit and adapted:
(a) to carry out, at the moment of connection of a said load to a said power outlet unit, a measurement indicative of the increase in power which would need to be supplied by the system to power this load, this measurement being effected in such a manner as to avoid appreciable overloading of the system;
(b) to effect a comparison of the result of said measurement with a measure of the additional power suppliable by the system, and
(c) to provide a comparison-indicative signal indicative of the result of said comparison;
each said power outlet unit including a switching arrangement having two operational states, in the first of which the connection of a said load to said power outlet unit results in the load being inserted between said control conductor means and one of the said supply conductors whereby to enable the control unit to carry out said measurement for that load and effect said comparison, and in the second of which the said switching arrangement connects the load across the two said supply conductors; change over from said first to said second state occurring only when the comparison-indicative signal provided by the control unit indicates that the power required for the operation of this load will not result in the maximum power suppliable by the system being exceeded,
said control conductor means include a primary control conductor emanating from said control unit and a plurality of further control conductors branching from said primary control conductor and each connected to a respective said power outlet unit, and said further control conductors are connected to earth, and each said power outlet unit comprising:
first and second input terminals connected respectively to said first and second power supply conductors of the distribution system;
a third input terminal connected to the corresponding said further control conductors;
first and second output terminals to which, in use, an electrical load may be connected;
a third output terminal which, in use, is connected to the earth terminal of a load;
first and second electrical contacts fixedly mounted in said power outlet unit;
a third contact connected to said third input terminal;
a relay including an excitation winding and first and second movable contact members; said first movable contact member being connected to said first output terminal and being movable between a working position and a rest position in which it is in contact respectively with the said first and second contacts; said second movable contact member being connected to said third output terminal and being fixed to said first contact member, the said second movable contact member being arranged to take up a working position and a rest position in which it respectively enables and prevents the connection of the said third contact to the said third output terminal of the power outlet unit; and the excitation coil of said relay being connected between the said third input terminal and the said second contact; and a hold-on coil connected between said first input terminal and said first fixed contact and operative to maintain said movable contact members of the relay in their respective working positions for the entire period of time during which a said load connected to the power outlet unit is supplied by said power distribution system.

3. An electric power distribution system comprising:
two power supply conductors;
a plurality of power outlet units connected to said two supply conductors whereby to enable the connection to the system of a corresponding plurality of electrical loads;
control conductor means;
a control unit connected by said control conductor means to each said power outlet unit and adapted:
(a) to carry out, at the moment of connection of a said load to a said power outlet unit, a measurement indicative of the increase in power which would need to be supplied by the system to power this load, this measurement being effected in such a manner as to avoid appreciable overloading of the system;
(b) to effect a comparison of the result of said measurement with a measure of the additional power suppliable by the system, and
(c) to provide a comparison-indicative signal indicative of the result of said comparison;
each said power outlet unit including a switching arrangement having two operational states, in the first of which the connection of a said load to said power outlet unit results in the load being inserted between said control conductor means and one of the said supply conductors whereby to enable the control unit to carry out said measurement for that load and effect said comparison, and in the second of which the said switching arrangement connects the load across the two said supply conductors; change over from said first to said second state occurring only when the comparison-indicative signal provided by the control unit indicates that the power required for the operation of this load will not result in the maximum power suppliable by the system being exceeded, said control conductor means include a plurality of control conductors each of which serves to individually connect a respective said power outlet unit to said control unit, and each said power outlet unit comprising:

first and second input terminals connected respectively to said first and second power supply conductors of the distribution system;

a third input terminal connected to the corresponding said control conductor;

first and second output terminals to which, in use, a said electrical load can be connected;

first and second electrical contacts fixedly mounted in said power outlet unit;

a relay including an excitation coil and a movable contact member, said movable contact member being connected to said first output terminal and being movable between a working position and a rest position in which it is in contact respectively with the said first and second contacts, the excitation coil of the said relay being connected between the said third input terminal and the said second contact;

a hold-on coil connected between the said first input terminal and the said first fixed contact and operative to maintain the movable contact member of the said relay in its said working position for the entire period of time during which a said load connected to the power outlet unit is supplied by the said electric power distribution system;

a resistor connected between the said second contact and the said second input terminal of the power outlet unit, the said resistor having a known resistance value higher than that of the maximum load which may be supplied through the power outlet.

4. A power outlet according to any one of the claims 1, 2 and 3, wherein said excitation coil and said hold-on coil are wound on a common core.

5. A power outlet according to claim 4, wherein said core is a saturable core.

* * * * *